| United States Patent [19] | [11] Patent Number: 4,999,173 |
| Kamiyama et al. | [45] Date of Patent: Mar. 12, 1991 |

[54] REMOVAL OF NITRIC OXIDES BY COPPER-CONTAINING ZEOLITES

[75] Inventors: Katsumi Kamiyama, Tokuyama; Kazushige Igawa, Shinnanyo, both of Japan

[73] Assignee: Tosoh Corporation, Shinnanyo, Japan

[21] Appl. No.: 255,018

[22] Filed: Oct. 7, 1988

[30] Foreign Application Priority Data

Oct. 7, 1987 [JP] Japan .............................. 62-251614
Oct. 7, 1987 [JP] Japan .............................. 62-251615
Oct. 7, 1987 [JP] Japan .............................. 62-251616

[51] Int. Cl.⁵ .......................... B01J 8/00; C01B 21/00
[52] U.S. Cl. ................................................. 423/239
[58] Field of Search .................. 423/239, 239 A, 235, 423/235 D

[56] References Cited

U.S. PATENT DOCUMENTS 3,689,212  9/1972  Pettit et al. ........................ 423/239
4,104,361  8/1978  Nishikawa et al. ................. 423/239
4,297,328  10/1981  Ritscher et al. .................... 423/239

*Primary Examiner*—Gregory A. Heller
*Attorney, Agent, or Firm*—Oblon, Spivak, McClelland, Maier & Neustadt

[57] ABSTRACT

Copper-containing zeolites are prepared by subjecting a zeolite having the lattice spacings (d value) indicated in Table 1 as estimated by powder X-ray diffraction to ion exchange with copper ions in an aqueous solution containing a water soluble copper salt and ammonia. Nitrogen oxides can be decomposed with the copper-containing zeolite catalyst.

2 Claims, 2 Drawing Sheets

REMOVAL OF NITRIC OXIDES BY COPPER-CONTAINING ZEOLITES

BACKGROUND OF THE INVENTION

1. Field of the Invention

The present invention relates to the production of catalysts and adsorbents which can be used for the removal of nitrogen oxides from exhaust gases containing the same.

2. Description of the Background

Nitrogen oxides (hereinafter referred to as $NO_x$) are found in combustion exhaust gases from industrial plants and automobiles and lead to the production of photochemical smog. Methods to prevent the formation of such smog are urgently needed for environmental safety.

At present, both dry and wet methods are known for the removal of $NO_x$. Using wet methods, the $NO_x$ is contained in exhaust liquids which are quite difficult to treat. Therefore, the wet methods are still not of practical use. Among the dry methods, there are known methods such as non-catalytic reduction, direct catalytic decomposition, selective catalytic reduction, and adsorption. Among these methods, the selective $NH_3$ catalytic reduction method is already in practical use. However, this process requires $NH_3$ as a reducing agent, and further requires devices for the recovery or decomposition of unreacted $NH_3$, thus leading to a more complicated process.

The direct catalytic decomposition of $NO_x$ is the most preferred method, since it entails the simplest process and does not require a reducing agent such as $NH_3$. Hitherto, a number of investigations have been performed on the direct catalytic decomposition of $NO_x$. Pt, CuO and $Co_3O_4$ are known to exhibit catalytic activity in decomposing $NO_x$, but the activity remains insufficient due to the poisoning action of the decomposition product oxygen. Thus, these catalysts cannot be used in practice.

Recently, the zeolite (ZSM-5) which contains copper ions and has a specific crystalline structure has been found to act as a decomposition catalyst for NO (Japanese Laid-Open Patent Application No. Sho 60-125250) in the direct catalytic decomposition of $NO_x$ which does not suffer from the poisoning action of moisture and oxygen even if they are present in the gas to be treated. The ZSM-5 containing copper as disclosed in the cited reference is prepared from conventional ZSM-5 by subjecting the same to ion exchange in an aqueous solution of a water-soluble divalent copper salt.

There are a large number of reports regarding ZSM5 containing copper. In Japanese Laid-Open Patent Application No. Sho 54-96500, for example, the ZSM-5 containing copper is prepared from ZSM-5 by repeated ion exchange with an aqueous solution of a watersoluble divalent copper salt. The product is used as a catalytic combustion catalyst.

In Japanese Laid-Open Patent Application No. Sho 57-36015 and U.S. Pat. No. 4,297,328, the ZSM-5 is ion exchanged three times with an aqueous solution of copper(II) chloride at a refluxing temperature to obtain a rate of exchanged copper ions of larger than 160%. The prepared materials are used as a combustion catalyst and as ternary catalyst, respectively.

However, as long as the conventional ion exchange method is employed, the exchange of a large amount of copper is not possible in a single run, instead, several repeated runs of exchange are needed.

ZSM-5 containing copper which evidences activity in the direct catalytic decomposition reaction of NO can be prepared by the process described in the existing literature. However, the ion exchange carried out as described in the literature does not yield a sufficient amount of copper ions in a single run and repeated runs are necessary. Therefore, several repeated procedures of ion exchange are needed to obtain a larger amount of exchanged copper and to attain a high activity for the decomposition of NO.

Thus, a need continues to exist for a process by which nitrogen oxides in exhaust gases can be catalytically decomposed in an efficacious manner. A need also continues to exist for a process by which a catalyst having the above-described properties can be prepared in high yield.

SUMMARY OF THE INVENTION

Accordingly, it is an object of this invention to provide a process for the production of a copper-containing zeolite catalyst which is advantageously used in the decomposition of nitrogen oxides in gases containing the same.

Further, it is an object of this invention to provide a process for the catalytic decomposition of nitrogen oxides.

These objects and others which will become more apparent in view of the following disclosure are provided, in particular, by a copper-containing zeolite which is produced by subjecting a zeolite having the following lattice spacings (d values) as determined by powder X-ray diffraction to ion exchange with copper ions in an aqueous solution containing a water-soluble copper salt and ammonia.

| lattice spacing (d value) | relative strength | lattice spacing (d value) | relative strength |
|---|---|---|---|
| 11.1 ± 0.3 | strong | 4.60 ± 0.08 | weak |
| 10.0 ± 0.3 | strong | 4.25 ± 0.08 | weak |
| 7.4 ± 0.2 | weak | 3.85 ± 0.07 | very strong |
| 7.1 ± 0.2 | weak | 3.71 ± 0.05 | strong |
| 6.3 ± 0.2 | weak | 3.04 ± 0.03 | weak |
| 6.04 ± 0.2 | weak | 2.99 ± 0.02 | weak |
| 5.56 ± 0.1 | weak | 2.94 ± 0.02 | weak |
| 5.01 ± 0.1 | weak | | |

DETAILED DESCRIPTION OF THE PREFERRED EMBODIMENTS

Figure 1:
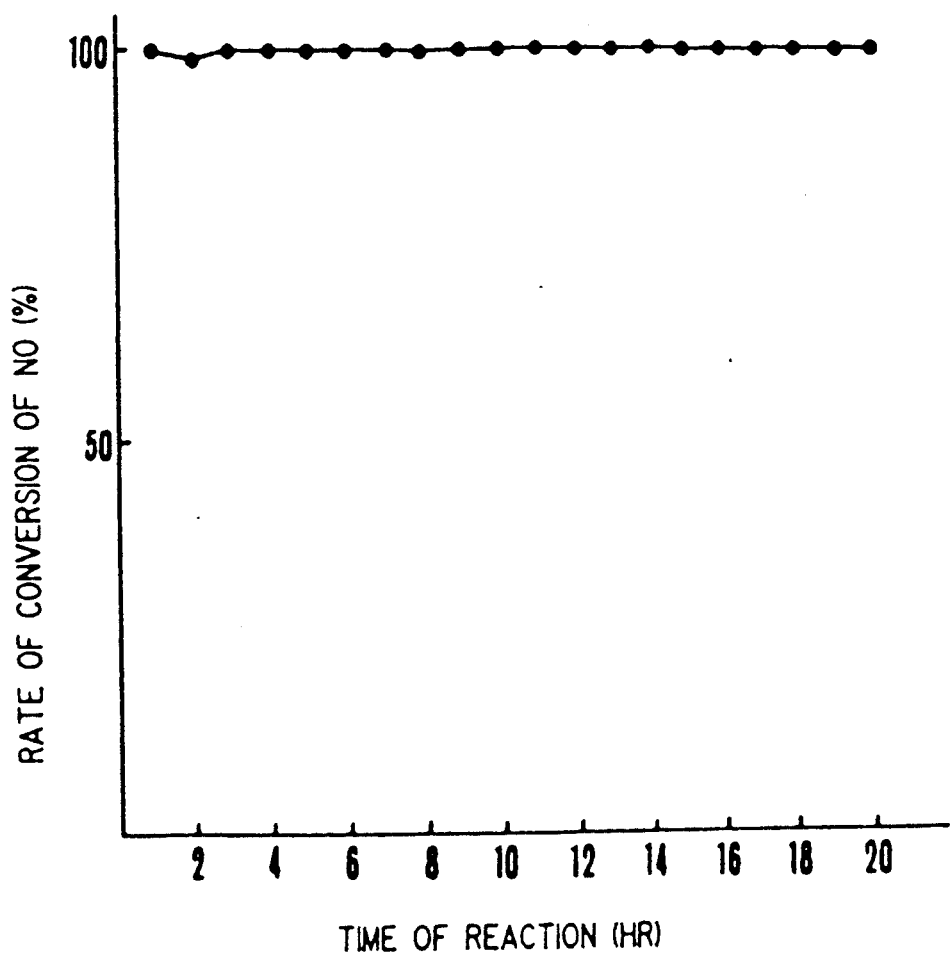
FIGS. 1 and 2 illustrate the time variation of the rate of conversion of NO in Examples 6 and 10, respectively.

The present invention relates to the production of catalysts which are used to remove nitrogen oxides from gases containing the same which are released from industrial plants and automobiles, for example. Also, this invention provides a process for producing catalysts for the direct catalytic decomposition of $NO_x$ as well as a method of use therefor.

The catalyst of the present invention is prepared from a basic material zeolite having the following lattice spacings (d values) as shown in Table 1. The basic material zeolite may be prepared by any known method without restriction.

TABLE 1

| Lattice spacing (d value) | Relative strength | Lattice spacing (d value) | Relative strength |
|---|---|---|---|
| 11.1 ± 0.3 | strong | 4.60 ± 0.08 | weak |
| 10.0 ± 0.3 | strong | 4.25 ± 0.08 | weak |
| 7.4 ± 0.2 | weak | 3.85 ± 0.07 | very strong |
| 7.1 ± 0.2 | weak | 3.71 ± 0.05 | strong |
| 6.3 ± 0.2 | weak | 3.04 ± 0.03 | weak |
| 6.04 ± 0.2 | weak | 2.99 ± 0.02 | weak |
| 5.56 ± 0.1 | weak | 2.94 ± 0.02 | weak |
| 5.01 ± 0.1 | weak | | |

Preferably, the ratio in moles of $SiO_2$ to $Al_2O_3$ of the zeolite to be used in this invention is 15 to 300, more preferably 20 to 200. The basic material zeolite having the lattice spacings (d values) as indicated in Table 1 has almost no activity in decomposing $NO_x$, if it is used without further treatment.

The copper-containing zeolite of the present invention can be prepared from the zeolite having the lattice spacings (d values) as indicated in Table 1 either by exchanging cations in the zeolite with copper ions in an aqueous solution containing a water-soluble copper salt and ammonia, or by supplying ammonia gas to be adsorbed on zeolites on which cations have been exchanged with copper ions.

Any copper salt may be used so long as it is a water-soluble salt. Salts applicable are, for example, the sulfate, chloride, acetate, nitrate and other salts of copper. Ammonia may be applied in the form of ammonia water, hydrous ammonia compounds, and aqueous solutions containing dissolved ammonia. The ammonia may be added in any amount, but preferably in such a amount that the pH of a slurry containing the zeolite is in the range from 4 to 12. When the pH is less than 4, the exchange of ions hardly occurs because of the low speed of ion exchange. When the pH exceeds 12, impure copper is deposited and therefore the activity of the catalyst in decomposing $NO_x$ is lowered. The concentration of copper ions in the aqueous solution may be set as needed according to the required rate of exchanged copper ions of the zeolite.

The copper ions in the form of $Cu^+$, $Cu^{2+}$, $CuOH^+$, and $[Cu(NH_3)_4]^{2+}$ exchange with cations on the zeolite. A part of the zeolite is also turned into the $NH_4$-type due to the presence of a large excess of $NH_3$ molecules.

In the above method of preparation, a rate of exchanged copper ions greater than 100% and a $NH_3$ content of more than 0.2 molecule per unit Cu atom can be achieved with the product obtained by a single exchange procedure.

The product produced by ion exchange is washed with water and dried, to obtain the present coppercontaining zeolite catalyst.

The copper content of the copper-containing zeolite is preferably larger than 0.03%, more preferably larger than 1% by weight. In general, the larger the copper content of the copper-containing zeolite is, the greater is the decomposition activity for $NO_x$.

The present copper-containing zeolite catalysts also exhibit high activities as a reductive denitration catalyst for $NO_x$.

The ratio in moles of $SiO_2$ to $Al_2O_3$ of copper-containing zeolite is substantially the same as that of the original zeolite. Also the crystalline structure of the copper-containing zeolite remains unchanged through the ion exchange treatment and therefore can be characterized by the lattice spacings (d values) indicated in Table 1.

The $NH_3$ content of the copper-containing zeolite catalyst was determined by the neutralization titration for the analysis of ammonia ("Handbook for Analytical Chemistry", 1971, Maruzen, Tokyo). The procedure used is as follows. First, a solution of NaOH is added to a sample of the catalyst, then $NH_3$ is liberated by distillation and absorbed in a known excess of a standard solution of acid where the excess of acid is determined by back titration with a standard solution of NaOH.

At present, it is not clear why the copper-containing zeolites prepared according to the present invention exhibit such a high activity in the catalytic decomposition of $NO_x$, however it is thought that the ammonia molecules captured on the zeolite together with copper ions are liberated in the pretreatment stage of the catalytic decomposition reaction of $NO_x$, and partially reduce the $Cu^{2+}$ into $Cu^+$ which forms an active site for the catalytic decomposition reaction of $NO_x$. The facility of the oxidation-reduction process, $Cu^+ \rightleftarrows Cu^{2+}$, is perhaps decisive in maintaining the high activity.

Japanese Laid-Open Patent Application Nos. Sho 54-96500 and Sho 57-36015 disclose that copper, after ion exchange treatment, exists in the form of $CuOH^+$ and can be changed to $Cu^+$ at temperatures approximately above 300° C. However, the copper-containing ZSM-5 prepared according to the method of these references exhibit a much lower activity for decompositing $NO_x$ than the copper-containing zeolite catalysts of the present invention.

The copper-containing zeolite catalysts of the present invention may have a higher activity due to the presence of $Cu^+$ which is formed when the ammonia molecules coordinating to copper ions are liberated in the pretreatment stage. This $Cu^+$ may be considered to be different in the degree of reduction from the $Cu^+$ formed via $CuOH^+$, thus leading to the difference in the activity for decomposing $NO_x$.

In short, the copper-containing zeolite catalysts prepared by the method of the present invention having a specific crystalline structure are highly active even at low temperatures as a result of the compound effect of structural stability and thermal resistance. The present catalysts are, moreover, free from the influence of oxygen and moisture, and are also stationarily stable.

In the decomposition reaction using the copper-containing zeolite catalysts, time of contact of the gases to be treated with the catalysts is not particularly restricted. In accordance with the components and the concentration of gas to be treated, the best ratio values for moles of $SiO_2$ to $Al_2O_3$ and the rate of exchanged copper ions can be selected. In the combined use of these factors, the temperature of the reaction and time of contact of the gas with the catalyst can be set so that the decomposition activity together with other characteristics of the catalyst can be exhibited to the highest degree.

The temperature at which the copper-containing zeolite catalysts are used as a decomposition catalyst for $NO_x$ is in the range from 200° to 1,000° C., preferably from 300° to 700° C.

The copper-containing zeolite catalysts prepared in the present invention can be used as a catalyst and also as an adsorbent in petroleum chemistry, the purification of petroleum and the prevention of environmental pollution. Among the above applications, these catalysts particularly exhibit excellent activity in decomposing $NO_x$, when they are used as a catalyst for decomposing and removing $NO_x$ from a gas containing the same.

The copper-containing zeolite catalysts of the present invention may also be supplied in the form of moldings which are shaped using such binders as clay minerals.

In another aspect of this invention, a zeolite molding which is shaped beforehand is submitted to exchange with copper ions in an aqueous solution containing a water-soluble copper salt and ammonia. The dimensions of the moldings are not particularly restricted.

The zeolite moldings as the basic material of the catalysts of this invention are required to exhibit the lattice spacings (d values) indicated in Table 1, but may be prepared by any known method without restriction. The zeolites are granulated using clay as a binder. For example, kaolin, attapulgite, montmorillonite, bentonite, allophane, and sepiolite may be used. Five to thirty parts of these binders are used to 100 parts of zeolite. Otherwise, moldings called binderless moldings, may be prepared directly from the zeolite, itself, without using any binder.

The present invention will now be further illustrated by reference to the following Examples which are provided solely for the purpose of illustration and are not intended to be limitative.

EXAMPLE 1

(Synthesis of zeolite)

Into an overflow type reaction tank of a 2 liter net capacity which is under agitation, aqueous solutions of sodium silicate ($SiO_2$; 153.4 g/l, $Na_2O$; 49.9 g/l, $Al_2O_3$; 0.8 g/l) and aluminum sulfate together with sulfuric acid ($Al_2O_3$; 38.4 g/l, $H_2SO_4$; 275.4 g/l) were supplied continuously at a speed of 3.2 l/hr and 0.1 l/hr, respectively. The temperature of the reaction was 30° to 32° C. and the pH of the slurry was 6.4 to 6.6. Solid matter was separated with a centrifuge from the slurry produced, thoroughly washed with water, to obtain a homogeneous and amorphous aluminosilicate compound in fine particles ($Na_2O$; 1.72 wt %, $Al_2O_3$; 2.58 wt %, $SiO_2$; 39.3 wt %, $H_2O$; 56.4 wt %). This homogeneous compound (2840 g) and an aqueous solution of NaOH (1.39 wt %, 5160 g) were placed in an autoclave of a 10 liter capacity and the solid matter was allowed to be crystallized at 160° C. under agitation for 72 hrs. The product obtained was separated, washed with water and dried, to obtain zeolite TSZ-821 which is used as a basic material for preparing the copper-containing zeolite catalyst. Chemical analysis revealed the composition to have a molar ratio of oxides on an anhydride basis:

1.05 $Na_2O.Al_2O_3.23.3\ SiO_2$

In addition, d values estimated by powder X-ray diffraction patterns were essentially identical with those indicated in Table 1.

Next, using the same procedure as that for the synthesis of TSZ-821, fine particles of homogeneous amorphous compounds of aluminosilicate of different $SiO_2$ and $Al_2O_3$ content were prepared, allowed to crystallize by heating in an aqueous solution of sodium hydroxide under agitation, to obtain zeolites TSZ-841 and TSZ-851 which are basic materials for the preparation of the copper-containing zeolite catalysts. These may be represented by the following formulae in molar ratios of oxides on an anhydride basis:

TSZ-841: 1.41 $Na_2O.Al_2O_3.40.4\ SiO_2$

TSZ-851: 1.05 $Na_2O.Al_2O_3.49.0\ SiO_2$

The d values of these zeolites determined by the powder X-ray diffraction patterns were essentially identical with those in Table 1.

EXAMPLE 2

(Preparation of copper-containing zeolite)

TSZ-821 obtained in Example 1 was taken in an amount of 10 g, mixed with a 0.1 mol/l aqueous solution of copper acetate so as to make the number of copper atoms equal to the number of Al atoms in the zeolite. The mixture was stirred at room temperature, mixed with a 2.5% aqueous $NH_3$ solution, to make the pH of the slurry 6.0. Then, the slurry was agitated for 12 hrs. at room temperature. The solid matter was separated, thoroughly washed with water, dried at 100° C. for 10 hrs. The copper-containing zeolite catalyst thus obtained was designated as TSZ-821-A. The rate of exchanged copper ions of the copper-containing zeolite catalyst as determined by chemical analysis is indicated in Table 2, where divalent copper was assumed to indicate the rate of exchanged copper ions. In addition, ammonia existing in the copper-containing zeolite catalyst was determined by the neutralization titration, of which result expressed in moles per unit atom of Cu is also found in Table 2.

TABLE 2

| Copper-containing zeolite | Rate of exchanged copper (%) | Cu content (wt %) | $NH_3$ ($NH_2$/Cu) |
|---|---|---|---|
| TSZ-821-A | 124 | 6.37 | 0.51 |

EXAMPLE 3

(Preparation of copper-containing zeolite catalyst)

The TSZ-821 obtained in Example 1 was taken in the amount of 10 g and an aqueous 0.1 mol/l solution of copper acetate was added so that the number of copper atoms is 0.34 times as many as that of Al atoms in the zeolite. The mixture was stirred at room temperature and mixed with a 2.5% aqueous solution of $NH_3$ to afford a pH of 10.5 in the resulting slurry. Then agitation was continued at room temperature until the required rate of exchanged copper ions is attained in the zeolite. Solid matter formed was separated, thoroughly washed with water, and dried at 100° C. for 10 hrs. The copper-containing zeolite obtained was named TSZ-821-B. The rate of exchanged copper ions of the copper-containing zeolite catalyst as determined by chemical analysis is shown in Table 3. Divalent copper was assumed on the exchange in determining the rate of exchanged copper ions.

Ammonia existing in the copper-containing zeolite catalyst was determined by the neutralization titration, of which result expressed in moles per unit atom of Cu is also found in Table 3.

EXAMPLE 4

(Preparation of copper-containing zeolite catalyst)

The TSZ-821, TSZ-841 and TSZ-851 obtained in Example 1 were taken each in the amount of 10 g and an aqueous 0.1 mol/l solution of copper acetate was added to each so that the number of copper atoms are equal to that of Al atoms in each zeolite. The mixtures were stirred at room temperature and mixed with a 2.5% aqueous solution of $NH_3$ to afford a pH of 10.5 in the resulting slurry. Then agitation was continued at room temperature until the required rate of exchanged copper ions was attained in the zeolite. Solid matter was separated, thoroughly washed with water, and dried at 100° C. for 10 hrs. The copper-containing zeolites obtained were named TSZ-821-C, TSZ-841-D, and TSZ-851-E, respectively. The rates of exchanged copper ions of the copper-containing zeolites determined by chemical analysis are shown in Table 3. Divalent copper was assumed on exchange in determining the rate of exchanged copper ions.

Ammonia existing in the copper-containing zeolite catalysts was determined by the neutralization titration, of which result expressed in moles per unit atom of Cu is also found in Table 3.

TABLE 3

| Copper-containing zeolite | Rate of exchanged copper (%) | Cu content (wt %) | $NH_3$ ($NH_3$/Cu) |
|---|---|---|---|
| TSZ-821-B | 66 | 3.43 | 0.82 |
| TSZ-821-C | 123 | 6.12 | 0.83 |
| TSZ-841-D | 121 | 3.61 | 0.78 |
| TSZ-851-E | 127 | 3.29 | 0.69 |

EXAMPLE 5

(Test of the decomposition activity for NO of copper-containing zeolite catalyst)

The copper-containing zeolite catalysts prepared in Examples 2, 3 and 4 were press-molded and broken into uniform particles of 42 to 80 mesh. A normal pressure flow-type fixed bed reaction tube was packed with 1 g of each catalyst. Prior to the reaction, the copper-containing zeolite catalysts were pretreated by elevating the temperature to 500° C. at a speed of 5° C./min in a stream of helium and maintaining the temperature for 2 hrs. Helium gas which contained NO in a concentration of 5000 ppm was forced to flow through the packing layer of the copper-containing zeolite catalysts at a flow rate of 15 cc/min to allow reaction. In 50 min of reaction at selected temperatures, the rate of conversion of NO was determined. Results are shown in Table 4.

TABLE 4

| | Copper-containing zeolite | | | | |
|---|---|---|---|---|---|
| | TSZ-821-A Rate of conversion of NO (%) | TSZ-821-B Rate of conversion of NO (%) | TSZ-821-C Rate of conversion of NO (%) | TSZ-841-D Rate of conversion of NO (%) | TSZ-851-E Rate of conversion of NO (%) |
| 400 | 97.3 | 94.0 | 97.2 | 94.1 | 95.8 |
| 500 | 100 | 100 | 100 | 100 | 80.5 |
| 600 | 100 | 100 | 100 | 100 | 60.3 |

EXAMPLE 6

(Stability of activity of the copper-containing zeolite catalyst)

Sustaining ability of the copper-containing zeolite catalyst TSZ-821-C (rate of exchanged copper ions of 123%) to decompose NO was determined. The same apparatus and the same method as in Example 5 were employed and the temperature for reaction 500° C. was selected. Time variation of the rate of conversion is shown in FIG. 1.

COMPARISON EXAMPLE 1

(Preparation of zeolite for comparison)

The TSZ-821 obtained in Example 1 was taken in the amount of 10 g, mixed with an aqueous 0.1 mol/l solution of copper acetate so that number of copper atoms is equal to that of Al atoms on the zeolite, and stirred for 12 hrs. at room temperature. Solid matter was separated from the slurry, washed with water and dried at 100° C. for 10 hrs. The obtained zeolite for comparison was named TSZ-821-F. The rates of exchanged copper ions on the catalysts for comparison which was determined by chemical analysis is shown in Table 5.

COMPARISON EXAMPLE 2

(Preparation of zeolite for comparison)

The TSZ-821 obtained in Example 1 was taken in the amount of 10 g, mixed with an aqueous 0.1 mol/l solution of copper acetate so that number of copper atoms is equal to that of Al atoms in the zeolite, and stirred for 12 hrs. at room temperature. Solid matter was separated from the slurry and washed with water. After repeating the procedure two times, the solid was dried at 100° C. for 10 hrs.

The obtained zeolite for comparison was named TSZ-821-G. The rate of exchanged copper ions on the catalysts for comparison, determined by chemical analysis, is found in Table 5.

COMPARISON EXAMPLE 3

(Preparation of zeolite for comparison)

The TSZ-821 obtained in Example 1 was taken in the amount of 10 g, mixed with an aqueous 0.1 mol/l solution of copper(II) chloride so that number of copper atoms is equal to that of Al atoms in the zeolite, and stirred for 12 hrs. at room temperature. Solid matter was separated from the slurry, washed with water and dried at 100° C. for 10 hrs. The obtained zeolite for comparison was named TSZ-821-H. The rates of exchanged copper ions on the catalyst for comparison determined by chemical analysis is shown in Table 5.

COMPARISON EXAMPLE 4

(Preparation of zeolite for comparison)

The TSZ-821 obtained in Example 1 was taken in the amount of 10 g, mixed with an aqueous 0.1 mol/l solution of copper(II) chloride so that number of copper atoms is equal to that of Al atoms on the zeolite, and stirred for 12 hrs. at room temperature. Solid matter was separated from the slurry and washed with water. After additional 2 time repetition of the procedure, the solid was dried at 100° C. for 10 hrs.

The obtained zeolite for comparison was named TSZ821-I. The rate of exchanged copper ions on the catalysts for comparison, determined by chemical analysis, is also found in Table 5.

TABLE 5

| Zeolite for comparison | Rate of exchanged copper ion (%) | Copper content (wt %) |
|---|---|---|
| TSZ-821-F | 88 | 4.43 |
| TSZ-821-G | 103 | 5.26 |
| TSZ-821-H | 88 | 4.50 |
| TSZ-821-I | 104 | 5.33 |

COMPARISON EXAMPLE 5

(Test of activity for decomposing NO of zeolite for comparison)

The rate of conversion of NO was determined according to the method in Example 5 with the zeolites for comparison prepared in Comparison Examples 1, 2, 3 and 4. Results are shown in Table 6.

TABLE 6

| | Zeolite for comparison | | | |
|---|---|---|---|---|
| | TSZ-821-F Rate of conversion of NO (%) | TSZ-821-G Rate of conversion of NO (%) | TSZ-821-H Rate of conversion of NO (%) | TSZ-821-I Rate of conversion of NO (%) |
| 400 | 60.0 | 70.0 | 61.5 | 65.0 |
| 500 | 55.2 | 67.5 | 58.0 | 59.8 |
| 600 | 38.8 | 52.3 | 39.0 | 47.0 |

COMPARISON EXAMPLE 6

(Preparation of zeolite for comparison)

The TSZ-821, TSZ-841 and TSZ-851 obtained in Example 1 were taken in the amount of 10 g each, mixed with an aqueous 0.1 mol/l solution of copper acetate so that number of copper atoms is equal to that of Al atoms on the zeolites, and stirred for 12 hrs. at room temperature. Solid matter was separated from the slurry and washed with water. This procedure was repeated 3 times and the product was dried at 100° C. for 10 hrs. The obtained zeolites for comparison were named TSZ-821-J, TSZ-841-K and TSZ-851-L, respectively. The rates of exchanged copper ions on the catalysts for comparison which were determined by chemical analysis are shown in Table 7.

TABLE 7

| Zeolite for comparison | Rate of exchanged copper ion (%) | Copper content (wt %) |
|---|---|---|
| TSZ-821-J | 112 | 5.67 |
| TSZ-841-K | 108 | 3.31 |
| TSZ-851-L | 118 | 3.16 |

COMPARISON EXAMPLE 7

(Test of activity for decomposing NO of zeolites for comparison)

The rate of conversion of NO was estimated with the zeolites for comparison prepared in Comparison Example 6, according to the method in Example 5. Results are found in Table 8.

TABLE 8

| | Zeolite for comparison | | |
|---|---|---|---|
| | TSZ-821-J Rate of conversion of NO (%) | TSZ-841-K Rate of conversion of NO (%) | TSZ-851-L Rate of conversion of NO (%) |
| 400 | 70.8 | 37.9 | 31.0 |
| 500 | 69.0 | 39.3 | 27.0 |
| 600 | 54.9 | 28.8 | 17.0 |

COMPARISON EXAMPLE 8

(Preparation of zeolite for comparison)

The TSZ-821 obtained in Example 1 was taken in the amount of 10 g, mixed with an aqueous 0.10 mol/l solution of copper(II) chloride. The mixture was stirred for 3 hrs. at a refluxing temperature. Solid matter was separated and washed. After repeating the procedure three times, the product was dried at 100° C. for 10 hrs. The zeolite for comparison thus obtained was named TSZ-821-M. The rate of exchanged copper ions as determined by chemical analysis is shown in Table 9.

TABLE 9

| Zeolite for comparison | Rate of exchanged copper ion (%) | Copper content (wt %) |
|---|---|---|
| TSZ-821-M | 167 | 6.38 |

COMPARISON EXAMPLE 9

(Test of activity of decomposing NO of zeolite for comparison)

The rate of conversion of NO was estimated by the method described in Example 5 with the zeolite for comparison prepared in Comparison Example 8. Results are shown in Table 10.

TABLE 10

| | Zeolite for comparison TSZ-821-M Rate of conversion of NO |
|---|---|
| 400 | 76.8 |
| 500 | 70.5 |
| 600 | 62.0 |

EXAMPLE 7

(Production of zeolite molding)

With 100 parts of zeolite prepared in Example 1, 20 parts of bole clay was mixed and thoroughly kneaded with a kneader. The starting mixture thus prepared was formed in cylinders of 1.5 mm diameter with an extrusion molder and the cylindrical moldings were dried at 100° C. for 10 hrs. Baking the above products at 650° C. for 1 hr gave zeolite moldings. Their chemical composition can be expressed by molar ratios of oxides on an anhydride basis as follows:

TSZ-821 molding: $0.78\ Na_2O \cdot Al_2O_3 \cdot 16.4\ SiO_2$

The d values of the TSZ-821 molding as determined by the powder X-ray diffraction pattern were essentially identical with those in Table 1.

EXAMPLE 8

(Preparation of copper-containing zeolite molding)

The molding of TSZ-821 produced in Example 7 was taken in the amount of 10 g and immersed in an aqueous 0.1 mol/l solution of copper acetate so that the number of copper atoms is equal to that of Al atoms on the zeolite. The mixture was stirred at room temperature, and mixed with an aqueous 2.5% solution of $NH_3$ so as to make the pH of the slurry 10.5.

Then stirring continued at room temperature for 12 hrs. Solid matter was separated, thoroughly washed with water, and dried at 100° C. for 10 hr. The copper ion content of the copper-containing zeolite molding (designated as TSZ-821-molding-A) as determined by chemical analysis is shown in Table 11.

TABLE 11

| Copper-containing zeolite molding | Copper content (wt %) |
|---|---|
| TSZ-821-molding-A | 5.17 |

EXAMPLE 9

(Test of activity for decomposing NO of the copper-containing zeolite molding)

The copper-containing zeolite molding (TSZ-821-molding-A) prepared in Example 8 was grounded in a mortar to obtain particles of 42 to 80 mesh. Then a normal pressure flow-type fixed bed reaction tube was packed with 1 g of the particles. Prior to the reaction, the copper-containing zeolite molding was heated up to 500° C. with an elevation speed at 5° C./min and the final temperature was maintained for 2 hrs. with passage of helium gas. A helium gas containing 5000 ppm of NO was passed through the layer packed with the copper-containing zeolite molding at a speed of 15 cc/min to allow reaction. In 50 min of the reaction, the rate of conversion of NO was estimated at each temperature of reaction. Results are found in Table 12.

TABLE 12

| Copper-containing zeolite molding Reaction Temperature (°C.) | TSZ-821-molding-A Conversion rate of NO (%) |
|---|---|
| 400 | 100 |
| 500 | 100 |
| 600 | 100 |

EXAMPLE 10

(Stability of activity of the copper-containing zeolite molding)

Figure 2:
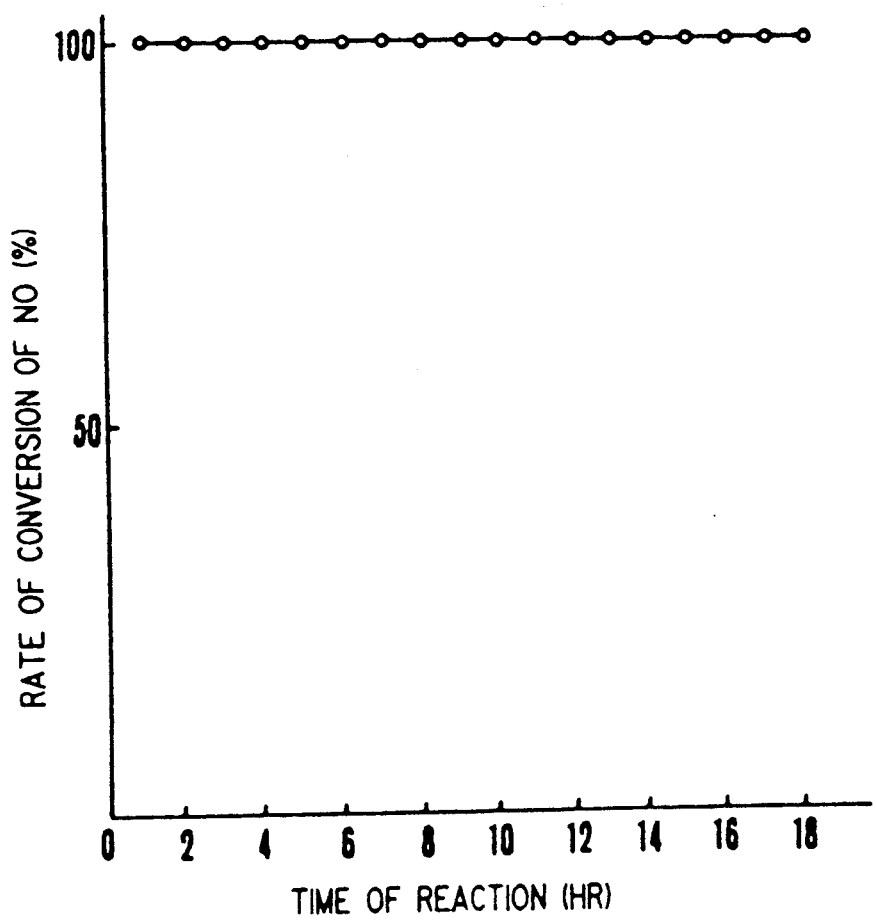

The sustained ability of the present catalysts for decomposing NO was tested using TSZ-821-molding-A containing copper. The same apparatus and the same method as in Example 9 were employed and the reaction was carried out at 500° C. Time variation of the rate of conversion is shown in FIG. 2.

COMPARISON EXAMPLE 10

(Preparation of zeolite for comparison)

The TSZ-821 molding obtained in Example 7 was taken in the amount of 10 g and mixed with an aqueous 0.1 mol/l solution of copper(II) chloride so that the number of copper atoms is equal to that of Al atoms in the zeolite, and the mixture was stirred at room temperature. Solid matter was separated from the slurry and washed. After repeating the procedure three times, the solid was dried at 100° C. for 10 hrs. Copper content of the zeolite for comparison (designated as TSZ-821-molding-B) obtained by the chemical analysis is shown in Table 13.

TABLE 13

| Zeolite for comparison | Copper content (wt %) |
|---|---|
| TSZ-821-molding-B | 5.46 |

COMPARISON EXAMPLE 11

(Test of activity for decomposing NO for zeolite for comparison)

The rate of conversion of NO was determined with the zeolite for comparison (TSZ-821-molding-B) prepared in Comparison Example 10 by the method in Example 9. Results are found in Table 14.

TABLE 14

| Reaction Temperature | Zeolite for comparison TSZ-821-molding-B Rate of conversion of NO (%) |
|---|---|
| 400 | 44.8 |
| 500 | 21.2 |
| 600 | 9.5 |

Having now fully described the present invention, it will be apparent to one of ordinary skill in the art that many changes and modifications can be made to the above descriptions while remaining within the spirit and scope of the present invention.

What is new and desired to be secured by Letters Patent of the United States is:

1. A process for the catalytic decomposition of nitrogen oxides and removal of the nitrogen oxides from a gas which contains said nitrogen oxides comprising:

bringing said gas containing said nitrogen oxides into contact with a copper-containing zeolite prepared by subjecting a zeolite having the lattice spacings (d values) indicated in the following Table as determined by powder X-ray diffraction to ion exchange with copper ions in an aqueous solution containing a water soluble copper salt and ammonia:

| Lattice spacing (d value) | Relative strength | Lattice spacing (d value) | Relative strength |
|---|---|---|---|
| 11.1 ± 0.3 | strong | 4.60 ± 0.08 | weak |
| 10.0 ± 0.3 | strong | 4.25 ± 0.08 | weak |
| 7.4 ± 0.2 | weak | 3.85 ± 0.07 | very strong |
| 7.1 ± 0.2 | weak | 3.71 ± 0.05 | strong |
| 6.3 ± 0.2 | weak | 3.04 ± 0.03 | weak |
| 6.04 ± 0.2 | weak | 2.99 ± 0.02 | weak |
| 5.56 ± 0.1 | weak | 2.94 ± 0.02 | weak |
| 5.01 ± 0.1 | weak | | |

2. The process according to claim 1, wherein said gas containing said nitrogen oxides is brought in contact with said copper-containing zeolite at a temperature in the range of 200° to 1,000° C.

* * * * *